US010917566B2

(12) United States Patent
Kim et al.

(10) Patent No.: US 10,917,566 B2
(45) Date of Patent: Feb. 9, 2021

(54) OPTIMUM SITUATION DETERMINATION IMAGING METHOD AND DEVICE FOR PERFORMING THE METHOD

(71) Applicant: LINKFLOW CO., LTD, Seoul (KR)

(72) Inventors: Yongkuk Kim, Gyeonggi-do (KR); Sungrae Cho, Seoul (KR); Yongjin Kim, Busan (KR); Junse Kim, Gyeonggi-do (KR)

(73) Assignee: LINKFLOW CO., LTD, Seoul (KR)

( * ) Notice: Subject to any disclaimer, the term of this patent is extended or adjusted under 35 U.S.C. 154(b) by 0 days.

(21) Appl. No.: 16/488,657

(22) PCT Filed: Dec. 12, 2017

(86) PCT No.: PCT/KR2017/014516
§ 371 (c)(1),
(2) Date: Aug. 26, 2019

(87) PCT Pub. No.: WO2019/004532
PCT Pub. Date: Jan. 3, 2019

(65) Prior Publication Data
US 2020/0045229 A1 Feb. 6, 2020

(30) Foreign Application Priority Data

Jun. 29, 2017 (KR) ........................ 10-2017-0082454

(51) Int. Cl.
*H04N 5/232* (2006.01)
*G06K 9/32* (2006.01)
*G02B 27/01* (2006.01)

(52) U.S. Cl.
CPC ....... *H04N 5/23238* (2013.01); *G06K 9/3275* (2013.01); *H04N 5/23212* (2013.01);
(Continued)

(58) Field of Classification Search
None
See application file for complete search history.

(56) References Cited

U.S. PATENT DOCUMENTS

| 8,259,187 B2 * | 9/2012 | Liu | H04N 5/23238 348/218.1 |
| 2011/0085060 A1 * | 4/2011 | Liu | H04N 5/23293 348/239 |

(Continued)

FOREIGN PATENT DOCUMENTS

| JP | 2010-045587 A | 2/2010 |
| JP | 2011-130282 A | 6/2011 |

(Continued)

OTHER PUBLICATIONS

English translation of International Search Report and Written Opinion dated Mar. 21, 2018 in corresponding International application No. PCT/KR2017/014516; 8 pgs.

(Continued)

*Primary Examiner* — William B Perkey
(74) *Attorney, Agent, or Firm* — Maier & Maier, PLLC

(57) ABSTRACT

An optimum situation determination imaging method and a device for performing the method. An optimum situation determination imaging method can include the step of an omnidirectional image processing device deciding whether or not a current imaging situation satisfies an optimum imaging situation condition, the omnidirectional image processing device performing imaging and generating a condition-satisfied omnidirectional image, wherein the optimum imaging situation condition can comprise a tilting condition of omnidirectional image processing device.

5 Claims, 10 Drawing Sheets

(52) U.S. Cl.
CPC ..... *H04N 5/23258* (2013.01); *H04N 5/23293* (2013.01); *G02B 2027/0138* (2013.01)

(56) References Cited

U.S. PATENT DOCUMENTS

| | | | |
|---|---|---|---|
| 2011/0211038 A1* | 9/2011 | Noguchi | H04N 5/232 |
| | | | 348/36 |
| 2013/0050407 A1* | 2/2013 | Brinda | H04N 5/23238 |
| | | | 348/38 |
| 2015/0124047 A1* | 5/2015 | Yatziv | H04N 5/23238 |
| | | | 348/37 |
| 2020/0120276 A1* | 4/2020 | Kim | H04N 5/23238 |

FOREIGN PATENT DOCUMENTS

| | | |
|---|---|---|
| JP | 2015-159383 A | 9/2015 |
| KR | 10-2008-0044093 A | 5/2008 |
| KR | 10-1263207 B1 | 5/2013 |

OTHER PUBLICATIONS

Written Opinion dated Mar. 21, 2018, in corresponding International application No. PCT/KR2017/014516; 10 pages.

Office Action dated Nov. 1, 2017, in corresponding Korean application No. 10-2017-0082454; including partial machine-generated English language translation; 10 pages.

\* cited by examiner

FIG. 3
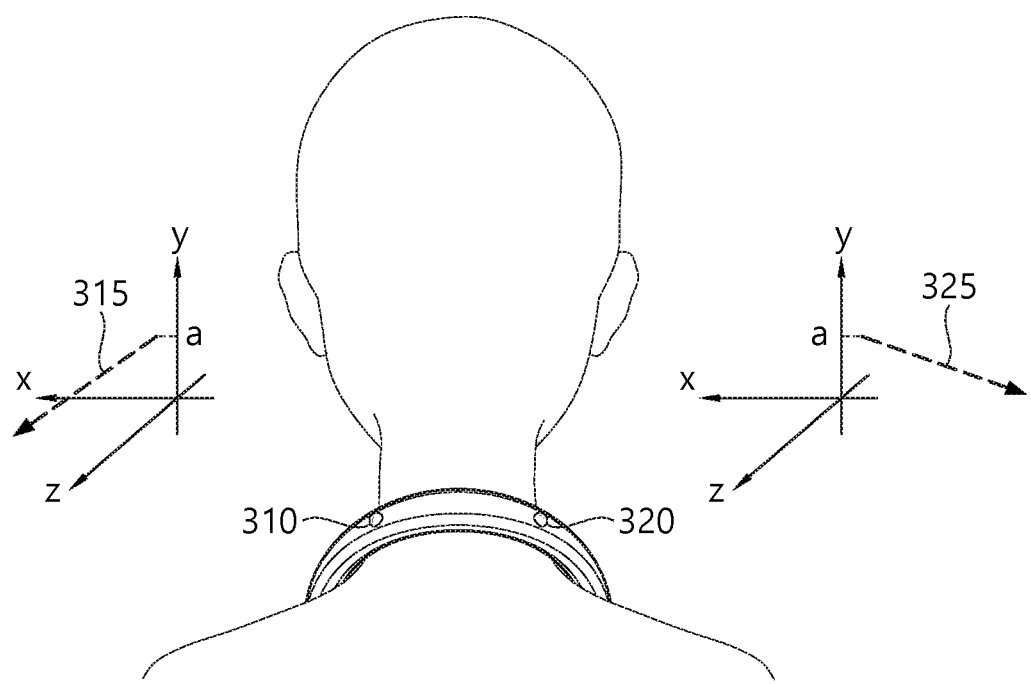
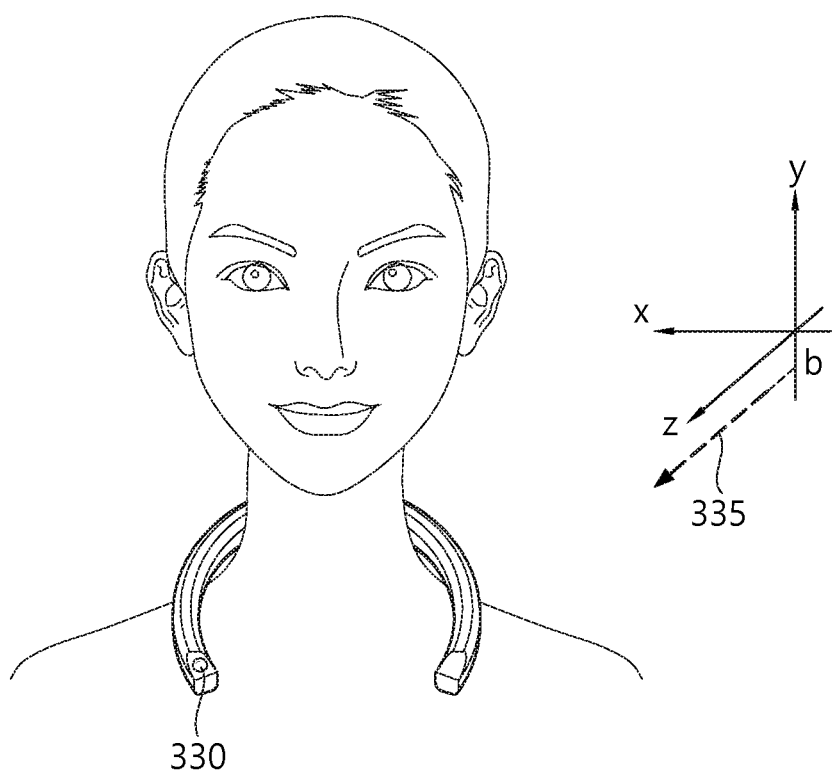

FIG. 4
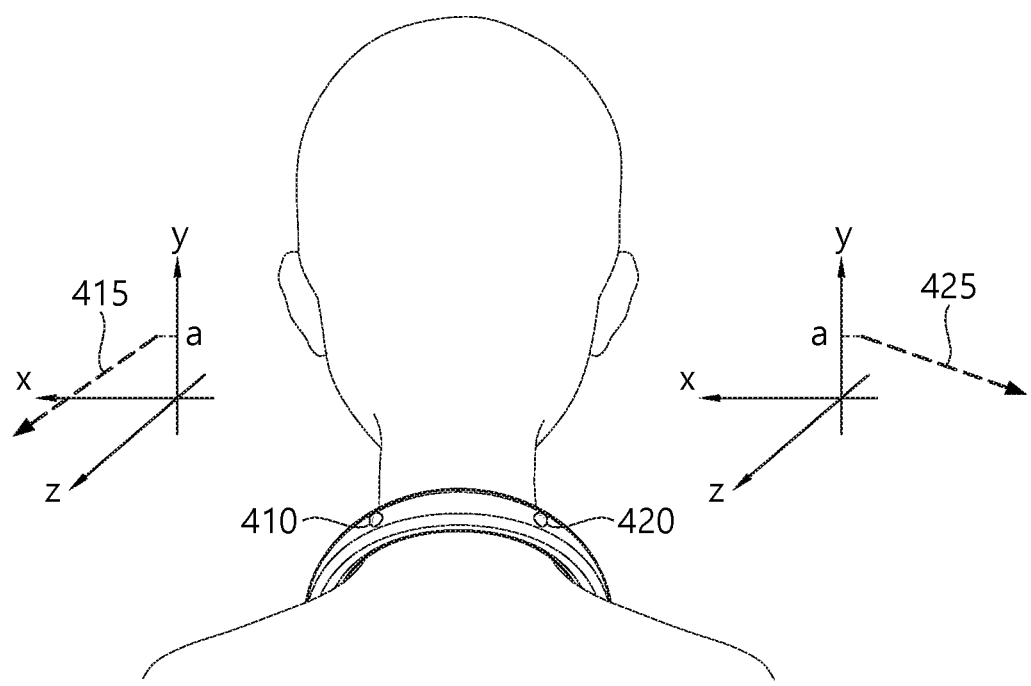
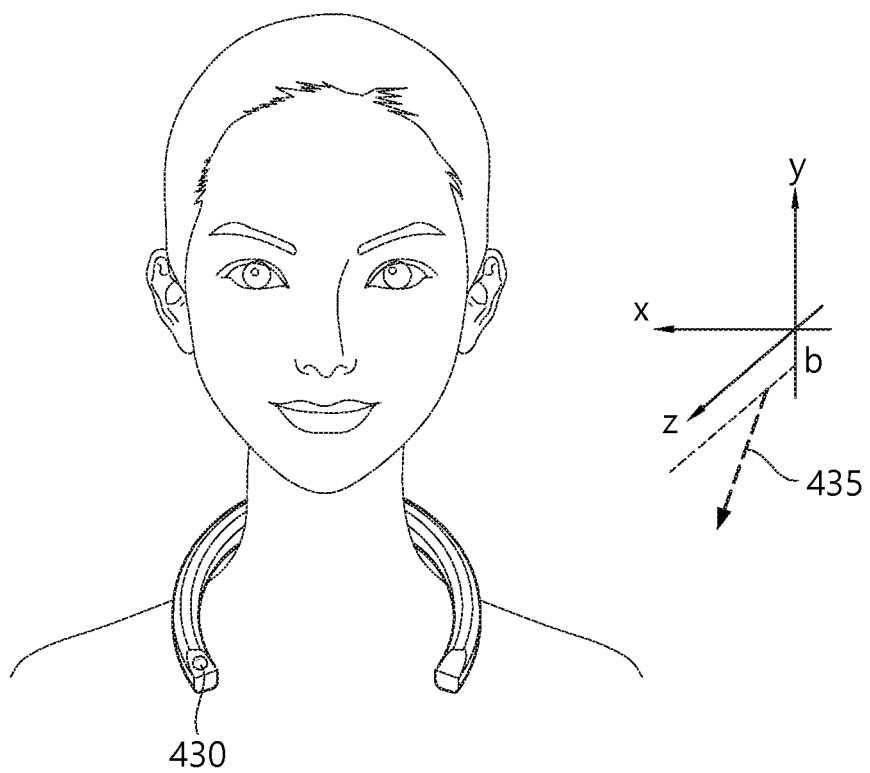

FIG. 10
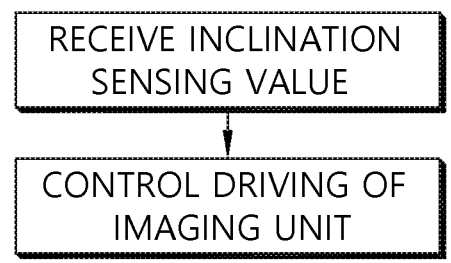
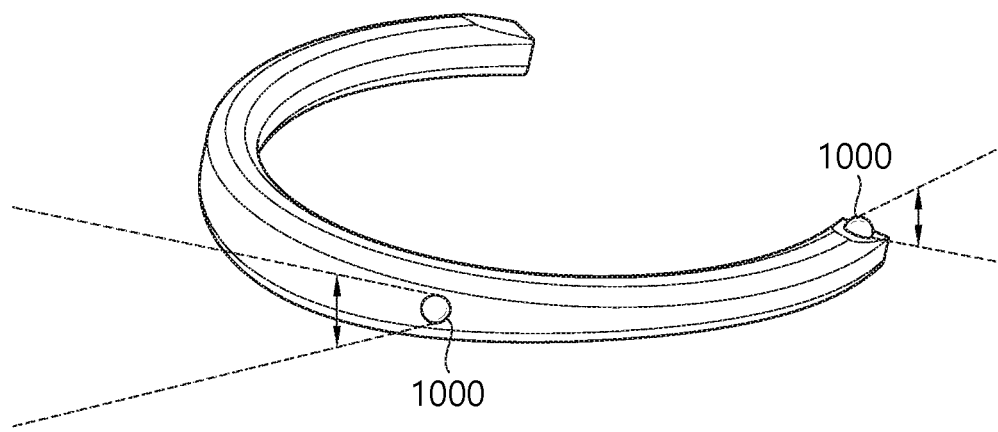

OPTIMUM SITUATION DETERMINATION IMAGING METHOD AND DEVICE FOR PERFORMING THE METHOD

CROSS-REFERENCE TO RELATED APPLICATION

This application claims priority to and the benefit of Korean Patent Application No. 2017-0082454, filed on 29 Jun. 2017, the disclosure of which is incorporated herein by reference in its entirety.

BACKGROUND

Field

The present invention relates to a method and apparatus for performing imaging based on optimal situation determination, and more particularly, to a method and apparatus for providing only an optimal image to a user by controlling an image processing apparatus to perform imaging in an optimal situation.

Background

An omnidirectional imaging system is an imaging system capable of recording image information of all directions (360 degrees) from a particular point. Since the omnidirectional imaging system can provide very wide field-of-view images, as compared to an existing imaging system, the range of applications of the omnidirectional imaging system has increasingly been broadened not only to research fields such as the fields of computer vision and mobile robots, but also to practical fields such as the fields of surveillance systems, virtual reality systems, and pan-tilt-zoom (PTZ) cameras, and video conferencing.

Various methods can be used to obtain an omnidirectional image. For example, images may be obtained by rotating one camera with respect to an optical axis that satisfies a single view point, and an omnidirectional image may be generated by combining the images. In another example, a method may be used in which a plurality of cameras are arranged into an annular structure and images obtained by the plurality of cameras are combined. A user may generate an omnidirectional image using various omnidirectional image processing apparatuses (or omnidirectional image processing cameras, 360 degrees cameras) for obtaining an omnidirectional image.

When an omnidirectional imaging apparatus is shaken, some images generated by the omnidirectional imaging apparatus may be blurry images. Accordingly, a method for providing an optimal image to a user is disclosed.

SUMMARY

The present invention is directed to solving the problems described above. Also, the present invention is directed to providing only an optimal image to a user by controlling an omnidirectional image processing apparatus to perform imaging in an optimal situation.

Also, the present invention is directed to generating a natural omnidirectional image based on an optimal image captured in an optimal situation by an omnidirectional image processing apparatus and providing the generated omnidirectional image to a user.

Representative configurations of the present invention for achieving the objectives are as follows.

One aspect of the present invention provides a method of performing imaging based on optimal situation determination, which is performed by an omnidirectional image processing apparatus, the method comprising determining whether a current imaging situation satisfies an optimal imaging situation condition and performing imaging and generating a condition-satisfied omnidirectional image when the current imaging situation satisfies the optimal imaging situation condition, wherein the optimal imaging situation condition includes an inclination condition of the omnidirectional image processing apparatus.

Another aspect of the present invention provides an omnidirectional image processing apparatus for performing imaging based on optimal situation determination, the omnidirectional image processing apparatus comprising a communication unit configured to communicate with an external device and a processor operatively connected to the communication unit, wherein the processor is implemented to determine whether a current imaging situation satisfies an optimal imaging situation condition and to perform imaging and generate a condition-satisfied omnidirectional image when the current imaging situation satisfies the optimal imaging situation condition, and the optimal imaging situation condition includes an inclination condition of the omnidirectional image processing apparatus.

According to the present invention, only an optimal image can be provided to a user by controlling an omnidirectional image processing apparatus to perform imaging in an optimal situation.

Also, according to the present invention, a natural omnidirectional image can be provided to a user based on an optimal image captured in an optimal situation by an omnidirectional image processing apparatus.

BRIEF DESCRIPTION OF THE DRAWINGS

FIG. 3 is a schematic view illustrating image capturing lines of a plurality of image capturing units according to an exemplary embodiment of the present inventive concept.

FIG. 4 is a schematic view illustrating image capturing lines of a plurality of image capturing units according to an exemplary embodiment of the present inventive concept.

FIG. 10 is a conceptual view showing an operation of an omnidirectional image processing apparatus according to an embodiment of the present invention.

DETAILED DESCRIPTION

Figure 1:
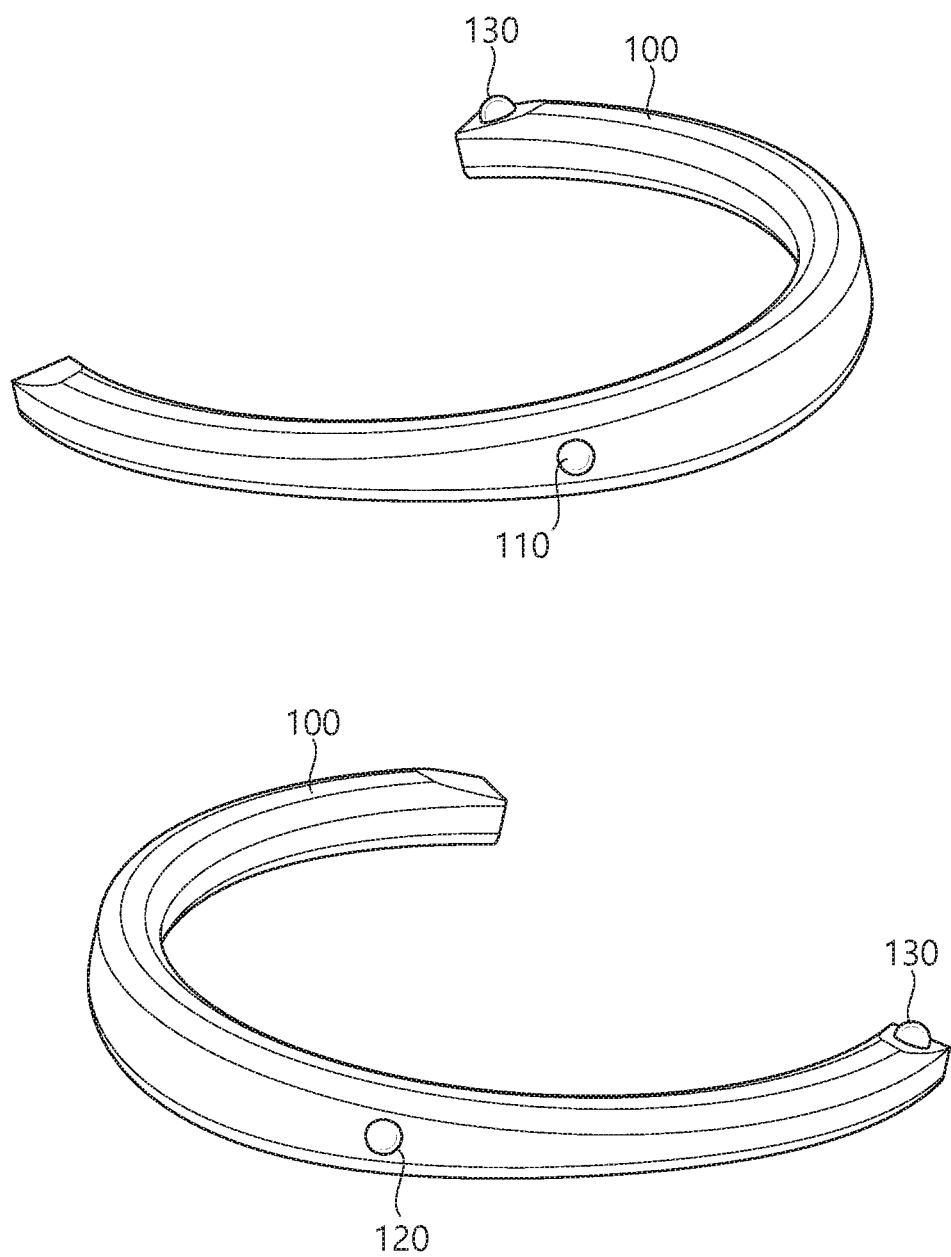
FIG. 1 is a schematic view illustrating an omnidirectional image processing apparatus according to an exemplary embodiment of the present inventive concept.

In the following detailed description of the present inventive concept, references are made to the accompanying drawings that show, by way of illustration, specific embodiments in which the present inventive concept may be practiced. These embodiments are described in sufficient detail to enable those skilled in the art to practice the present inventive concept. It is to be understood that the various embodiments of the present inventive concept, although different from each other, are not necessarily mutually exclusive. For example, specific shapes, structures and characteristics described herein may be implemented as modified from one embodiment to another without departing from the spirit and scope of the present inventive concept. Furthermore, it shall be understood that the locations or arrangements of individual components within each embodiment may also be modified without departing from the spirit and scope of the present inventive concept. Therefore, the following detailed description is not to be taken in a limiting sense, and the scope of the present inventive concept is to be taken as encompassing the scope of the appended claims and all equivalents thereof. In the drawings, like reference numerals refer to the same or similar elements throughout the several views.

Hereinafter, preferred embodiments of the present inventive concept will be described in detail with reference to the accompanying drawings to enable those skilled in the art to easily implement the present inventive concept.

Hereinafter, an image processing apparatus according to an embodiment of the present invention may include an omnidirectional image processing apparatus. The omnidirectional image processing apparatus may include an omnidirectional camera (a 360-degree camera) capable of capturing an omnidirectional image (or a 360-degree image).

Also, image information and video information to be disclosed below in an embodiment of the present invention may include an omnidirectional image (or a 360-degree image).

FIG. 1 is a schematic view illustrating an omnidirectional image processing apparatus according to an exemplary embodiment of the present inventive concept.

The structure of the omnidirectional image processing apparatus according to an exemplary embodiment of the present inventive concept is as illustrated in FIG. 1.

Referring to FIG. 1, an omnidirectional image processing apparatus 100 may have a wearable structure and may have a necklace-like shape that can be worn around the neck of a user. The omnidirectional image processing apparatus 100 may be in the shape of an open necklace that is open on one side thereof, as illustrated in FIG. 1, or in the shape of a non-open necklace. In the description that follows, it is assumed that the omnidirectional image processing apparatus 100 has a U shape that is open on one side thereof. The omnidirectional image processing apparatus 100, which is U-shaped, may be worn around the neck of the user as a wearable device and may be able to capture an omnidirectional image.

For convenience, it is assumed that the omnidirectional image processing apparatus 100 is worn around the neck of the user in the shape of a necklace (or in the shape of an open necklace that is open on one side thereof or in a U shape). However, the omnidirectional image processing apparatus 100 may not necessarily be worn around the neck of the user. For example, the omnidirectional image processing apparatus 100 may acquire an omnidirectional image by being hung on/attached to other parts of the body of the user or an external object.

The user can wear the omnidirectional image processing apparatus 100 around his or her neck and can thus acquire a plurality of images for generating an omnidirectional image with both hands free.

The omnidirectional image processing apparatus 100 may include a plurality of image capturing units. The plurality of image capturing units may be provided in the omnidirectional image processing apparatus 100 to be a particular distance (or a predetermined distance) apart from one another and may independently capture images in accordance with a predetermined field of view/image capturing line. The locations of the plurality of image capturing units may be fixed in the omnidirectional image processing apparatus 100, or the plurality of image capturing units may be movable so that their locations may vary.

For example, the omnidirectional image processing apparatus 100 may include three image capturing units, and the three image capturing units may capture an omnidirectional image with a predetermined field of view (e.g., 120 degrees to 180 degrees). The three image capturing units may be first, second, and third image capturing units 110, 120, and 130.

For convenience, an omnidirectional image processing apparatus 100 including three image capturing units will be described below. However, the omnidirectional image processing apparatus 100 may be modified to include a plurality of image capturing units other than three (e.g., two, four, five, or six image capturing units) to capture an omnidirectional image, without departing from the spirit and scope of the present inventive concept.

The first, second, and third image capturing units 110, 120, and 130 may capture an image in accordance with a predetermined field of view. At given time resources, a first image may be generated by the first image capturing unit 110, a second image may be generated by the second image capturing unit 120, and a third image may be generated by the third image capturing unit 130. The first, second, and third image capturing units 110, 120, and 130 may have a field of view of 120 degrees or greater, and there may exist overlapping areas between the first, second, and third images. Thereafter, an omnidirectional image may be generated by stitching together and/or correcting the first, second, and third images, which are captured at the given time resources by the omnidirectional image processing apparatus 100. The stitching and/or the correcting of a plurality of images may be performed by the omnidirectional image processing apparatus or may be performed by a user device (such as a smartphone) that can communicate with the omnidirectional image processing apparatus 100. That is, additional image processing for a plurality of images generated may be performed by the omnidirectional image processing apparatus 100 and/or another image processing apparatus (such as a smartphone, a personal computer (PC), or the like).

The characteristics of the omnidirectional image processing apparatus and an omnidirectional image generation method will hereinafter be described.

Figure 2:
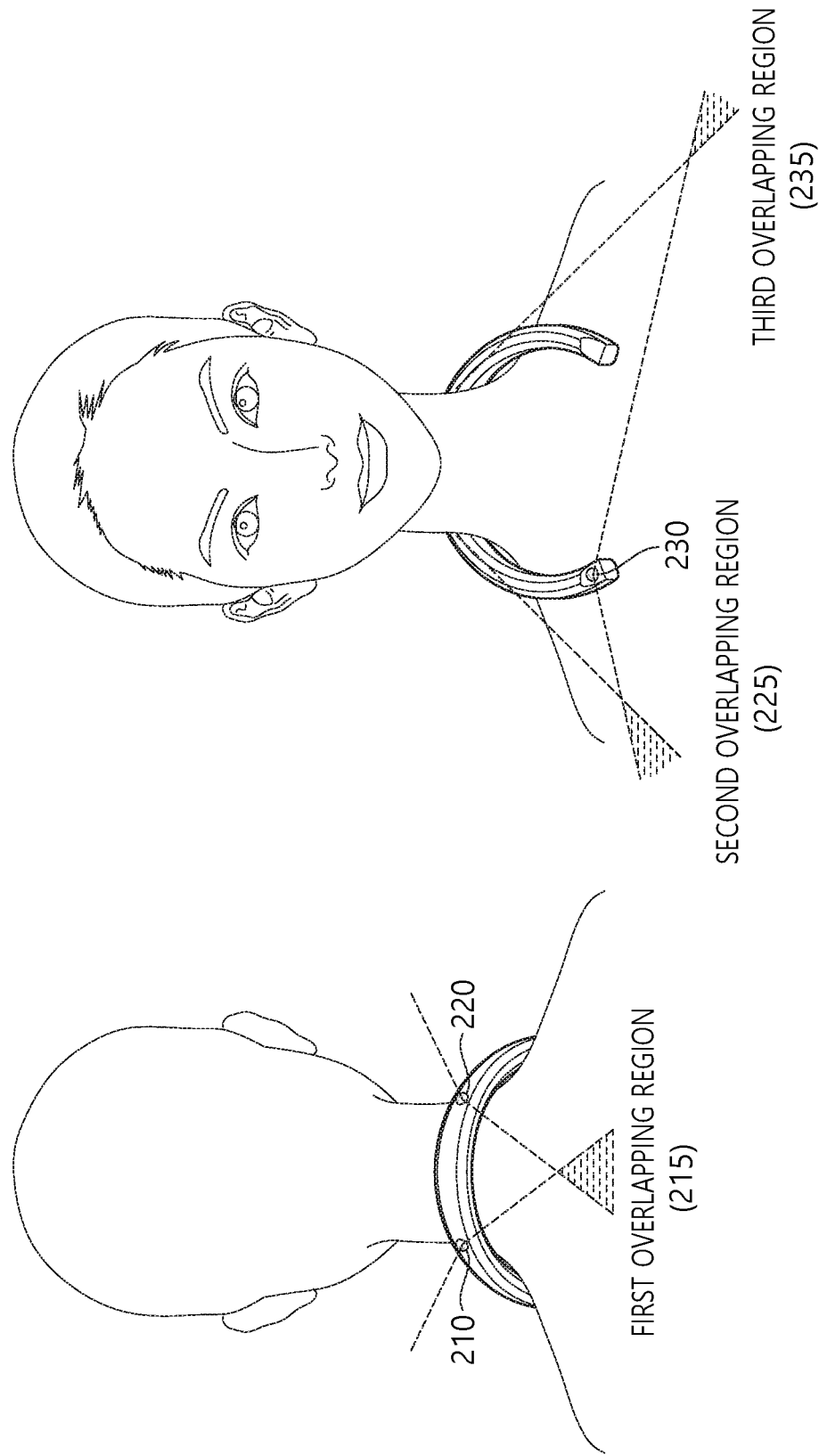
FIG. 2 is a schematic view showing the characteristics of a plurality of image capturing units provided in the omnidirectional image processing apparatus according to an exemplary embodiment of the present inventive concept.

FIG. 2 is a schematic view showing the characteristics of a plurality of image capturing units provided in the omnidirectional image processing apparatus according to an exemplary embodiment of the present inventive concept.

FIG. 2 shows the characteristics of a plurality of image capturing units provided in a U-shaped omnidirectional image processing apparatus. The locations of the plurality of image capturing units illustrated in FIG. 2 are merely exemplary. The plurality of image capturing units may be disposed at various locations in the omnidirectional image processing apparatus to capture a plurality of images for generating an omnidirectional image.

The rear of the omnidirectional image processing apparatus is as illustrated in the upper part of FIG. 2.

First and second image capturing units 210 and 220, which are included in the omnidirectional image processing apparatus, may be located at a curved part of the omnidirectional image processing apparatus where curvature is present. Specifically, when a user wears the omnidirectional image processing apparatus around his or her neck as a wearable device, the first and second image capturing units 210 and 220 may be provided at the curved part of the omnidirectional image processing apparatus that is in contact with the back of the neck of the user. For example, the first and second image capturing units 210 and 220 may be a predetermined distance apart from a point on the U-shaped omnidirectional image processing apparatus with a maximum curvature (e.g., the middle part of the U-shaped omnidirectional image processing apparatus).

The first image capturing unit 210 may capture an image of a region including a rear left blind spot with respect to the user's line of sight. The second image capturing unit 220 may capture an image of a region including a rear right blind spot with respect to the user's line of sight. Specifically, the first image capturing unit 210 may have a first field of view and may capture an image of a region corresponding to the first field of view. The second image capturing unit 220 may have a second field of view and may capture an image of a region corresponding to the second field of view. For example, the first and second fields of view may be 120 degrees to 180 degrees.

When image capturing is performed by the first and second image capturing units 210 and 220, a first overlapping area 215, which is the overlapping area of the first and second fields of view, may be generated. Thereafter, an omnidirectional image may be generated through image stitching in consideration of the overlapping area.

The front of the omnidirectional image processing apparatus is as illustrated in the lower part of FIG. 2.

A third image capturing unit 230 may be disposed at the front of the omnidirectional image processing apparatus. Specifically, the third image capturing unit 230 may be disposed at an end portion of the omnidirectional image processing apparatus (i.e., at an end portion of the U-shaped omnidirectional image processing apparatus). When a user wears the omnidirectional image processing apparatus around his or her neck as a wearable device, the end portion of the U-shaped omnidirectional image processing apparatus may face forward (i.e., toward the direction of the user's line of sight). The omnidirectional image processing apparatus includes first and second end portions, and the third image capturing unit 230 may be disposed at one of the first and second end portions.

The third image capturing unit 230 may perform image capturing in the same direction as the user's line of sight to capture an image of a region corresponding to the user's line of sight.

Specifically, the third image capturing unit 230 may have a third field of view and may capture an image of a region corresponding to the third field of view. For example, the third field of view may be 120 degrees to 180 degrees. When image capturing is performed by the third image capturing unit 230, a second overlapping area 225, which is the overlapping area of the first field of view of the first image capturing unit 210 and the third field of view of the third image capturing unit 230, may be generated. Also, when image capturing is performed by the third image capturing unit 230, a third overlapping area 235, which is the overlapping area of the second field of view of the second image capturing unit 220 and the third field of view of the third image capturing unit 230, may be generated.

Due to the structural characteristics of the omnidirectional image processing apparatus as a wearable device that can be worn around the neck of a user, the first and second image capturing units 210 and 220 may be positioned higher than the third image capturing unit 230 on the basis of the ground. Also, the third image capturing unit 230 may be disposed at only one end portion of the omnidirectional image processing apparatus.

In an existing omnidirectional image processing apparatus, a plurality of image capturing units may be configured to be disposed at the same height and a predetermined angle, but in the omnidirectional image processing apparatus according to an exemplary embodiment of the present inventive concept, a plurality of image capturing units may be configured to have different angles with respect to each other and to be disposed at different heights. Thus, the first, second, and third overlapping areas 215, 225, and 235, which are generated by a plurality of images captured by the plurality of image capturing units of the omnidirectional image processing apparatus according to an exemplary embodiment of the present inventive concept, may have different sizes and/or different shapes.

Thereafter, an omnidirectional image may be generated by performing image processing (such as image stitching/correction) on the first, second, and third images each generated by the first, second, and third image capturing units 210, 220, and 230 in consideration of the first, second, and third overlapping areas 215, 225, and 235.

The first, second, and third fields of view may be set to be the same, or to differ from one another, without departing from the spirit and scope of the present inventive concept.

FIG. 3 is a schematic view illustrating image capturing lines of a plurality of image capturing units according to an exemplary embodiment of the present inventive concept.

FIG. 3 illustrates image capturing lines of a plurality of image capturing units installed in an omnidirectional image processing apparatus according to an exemplary embodiment of the present inventive concept. Assuming that the ground is parallel to the X-Z plane formed by the X axis and the Z axis, the plurality of image capturing lines may be defined as lines vertically penetrating the centers of the lenses of the plurality of image capturing units included in the omnidirectional image processing apparatus according to an exemplary embodiment of the present inventive concept in a space defined by the X axis, the Y axis, and the Z axis.

In an existing omnidirectional image processing apparatus, a plurality of image capturing units may be implemented at the same height at a predetermined angle (for example, 120 degrees). In this case, a plurality of image capturing lines of the plurality of image capturing units included in the existing omnidirectional image processing apparatus may be a plurality of lines extending in parallel to the ground (or the X-Z plane) and having a predetermined angle (for example, 120 degrees) with respect to one another.

As already described above, in the omnidirectional image processing apparatus according to an exemplary embodiment of the present inventive concept, the plurality of image capturing units may have different heights (or locations) and different angles with respect to one another (or the image capturing lines of the plurality of image capturing units have different angles with respect to one another) during image capturing. Thus, the properties of the image capturing lines of the omnidirectional image processing apparatus according to an exemplary embodiment of the present inventive concept differ from the properties of the image capturing lines of the existing omnidirectional image processing apparatus.

The image capturing lines of the plurality of image capturing units, illustrated in FIG. 3, are exemplary for showing differences in properties (for example, in height and angle) between the image capturing lines of the plurality of image capturing units, resulting from the characteristics of a wearable device. Also, the image capturing lines of FIG. 3 may be image capturing lines when a user who wears the omnidirectional image processing apparatus according to an exemplary embodiment of the present inventive concept does not move or the omnidirectional image processing apparatus according to an exemplary embodiment of the present inventive concept is fixed in a particular state.

The upper part of FIG. 3 illustrates image capturing lines of first and second image capturing units 310 and 320.

The first and second image capturing units 310 and 320 may be positioned relatively higher than a third image capturing unit 330. Assuming that a user who wears the omnidirectional image capturing apparatus around is standing in a Y-axis direction, due to the structural characteristics of a wearable device that can be worn on the neck, a part of the omnidirectional image capturing apparatus with curvature (i.e., a curved/central part of a U shape) where the first and second image capturing units 310 and 320 are disposed may be relatively raised, and a leg part of the omnidirectional image capturing apparatus (i.e., an end part of the U shape) where the third image capturing unit 330 is disposed may be relatively dropped.

For example, a first image capturing line 315 of the first image capturing line 310 may be parallel to the X-Z plane and may have a first angle, a second angle, and a third angle with respect to the X axis, the Y axis, and the Z axis, respectively, at a point "a" on the Y axis.

A second image capturing line 325 of the second image capturing unit 320 may be parallel to the X-Z plane and may have a fourth angle, a fifth angle, and a sixth angle with respect to the X axis, the Y axis, and the Z axis, respectively, at the point "a" on the Y axis.

Referring to the lower part of FIG. 3, a third image capturing line 335 of the third image capturing unit 330 may be parallel to the X-Z plane and may have a seventh angle, an eighth angle, and a ninth angle with respect to the X axis, the Y axis, and the Z axis, respectively, at a point "b" on the Y axis. Here, b may be a smaller value than a. The third image capturing line 335 of the third image capturing unit 330 may be parallel to the X-Z plane and may face forward like the user's line of sight (for example, toward a direction perpendicular to the X-Y plane).

That is, the first and second image capturing lines 315 and 325 may have the same height with respect to the Y axis, and the third image capturing line 335 may be positioned relatively lower than the first and second image capturing lines with respect to the Y axis. The first, second, and third image capturing lines 315, 325, and 335 illustrated in FIG. 3 are exemplary image capturing lines having different properties, and various image capturing lines other than those set forth herein can be defined to capture an omnidirectional image.

FIG. 4 is a schematic view illustrating image capturing lines of a plurality of image capturing units according to an exemplary embodiment of the present inventive concept.

FIG. 4 illustrates image capturing lines of a plurality of image capturing units, which are different from those of FIG. 3. It is assumed that the ground is parallel to the X-Z plane formed by the X axis and the Z axis.

The upper part of FIG. 4 illustrates image capturing lines of first and second image capturing units 410 and 420.

The first and second image capturing units 410 and 420 may be positioned relatively higher than a third image capturing unit 430. Assuming that a user is standing in a Y-axis direction, due to the structural characteristics of a wearable device that can be worn around the neck, image capturing may be performed in a state in which a part of the omnidirectional image capturing apparatus with curvature (i.e., a curved part of a U shape) where the first and second image capturing units 410 and 420 are disposed is relatively raised and a leg part of the omnidirectional image capturing apparatus (i.e., an end part of the U shape) where the third image capturing unit 430 is disposed is relatively dropped.

For example, a first image capturing line 415 of the first image capturing line 410 may be parallel to the X-Z plane and may have a first angle, a second angle, and a third angle with respect to the X axis, the Y axis, and the Z axis, respectively, at a point "a" on the Y axis.

A second image capturing line 415 of the second image capturing unit 420 may be parallel to the X-Z plane and may have a fourth angle, a fifth angle, and a sixth angle with respect to the X axis, the Y axis, and the Z axis at the point "a" on the Y axis.

The lower part of FIG. 4 illustrates an image capturing line of the third image capturing unit 430.

A third image capturing line 435 of the third image capturing unit 430 may be parallel to the X-Z plane and may have a seventh angle, an eighth angle, and a ninth angle with respect to the X axis, the Y axis, and the Z axis, respectively, at a point "b" on the Y axis.

Since the third image capturing unit 430 is disposed at an end portion of the omnidirectional image processing apparatus, the third image capturing line may not be parallel to the X-Z plane and may have a predetermined angle (for example, 0 to 30 degrees) with respect to the X-Z plane.

That is, the first and second image capturing lines 415 and 425 may have the same height with respect to the Y axis, and the third image capturing line 435 may be positioned relatively lower than the first and second image capturing lines 415 and 425 with respect to the Y axis. Also, the first and second image capturing lines 415 and 425 may be parallel to the X-Z plane, but the third image capturing line 435 may not be parallel to the X-Z plane.

In another exemplary embodiment of the present inventive concept, the first image capturing line of the first image capturing unit may form a first' angle with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form the first' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a second' angle with respect to the X-Z plane and may have a seventh angle, an eighth angle, and a ninth angle with respect to the X axis, the Y axis, and the Z axis, respectively, starting from a point "b" on the Y axis.

In yet another exemplary embodiment of the present inventive concept, the first image capturing line of the first image capturing unit may form angle 1' with respect to the X-Z plane and may have a first angle, a second angle, and a third angle with respect to the X axis, the Y axis, and the Z axis, respectively, starting from the point "a" on the Y axis. Also, the second image capturing line of the second image capturing unit may form a second' angle with respect to the X-Z plane and may have a fourth angle, a fifth angle, and a sixth angle with respect to the X axis, the Y axis, and the Z axis, respectively, starting from the point "a" on the Y axis. The third image capturing line of the third image capturing unit may form a third' angle with respect to the X-Z plane and may have a seventh angle, an eighth angle, and a ninth angle with respect to the X axis, the Y axis, and the Z axis, respectively, starting from the point "b" on the Y axis.

That is, in the omnidirectional image processing apparatus according to an exemplary embodiment of the present inventive concept, the image capturing lines of a plurality of image capturing units may be positioned at different points on the Y axis and may have different angles with respect to the ground (or the X-Z plane) unlike in an image processing apparatus where the image capturing lines of a plurality of image capturing units have the same angle with respect to the ground at a given point on the Y axis.

When the omnidirectional image processing apparatus is a wearable device, the omnidirectional image processing apparatus may capture a blurry image while shaken or may capture an inclined image while inclined.

When the omnidirectional image processing apparatus is implemented as a wearable device, it is difficult to check and correct a captured image in real time when a preview capable of checking an imaging position and an imaging result of the omnidirectional image processing apparatus is not provided.

When a user wears the omnidirectional image processing apparatus on his/her neck and captures an omnidirectional image, the omnidirectional image processing apparatus moves vertically and horizontally according to the user's motion. Such a movement of the omnidirectional image processing apparatus may cause shaking, blurring, and the like of the omnidirectional image. The shaking and blurring of the omnidirectional image increase a feeling of fatigue in users who are viewing the omnidirectional image.

According to the present invention, in order to solve this problem, the orientation and position information of the omnidirectional image processing apparatus may be checked using a sensor or the like without a user needing to check an omnidirectional imaging result in real time, and then an imaging operation may be performed. Through such a method, when it is determined that the omnidirectional image processing apparatus is located at a point of interest (POI) or has an optimal orientation, the omnidirectional image processing apparatus may perform imaging.

That is, due to the omnidirectional image processing apparatus recognizing an imaging situation and performing imaging when the imaging situation satisfies a predetermined condition, an optimal omnidirectional image may be acquired without user confirmation.

Figure 5:
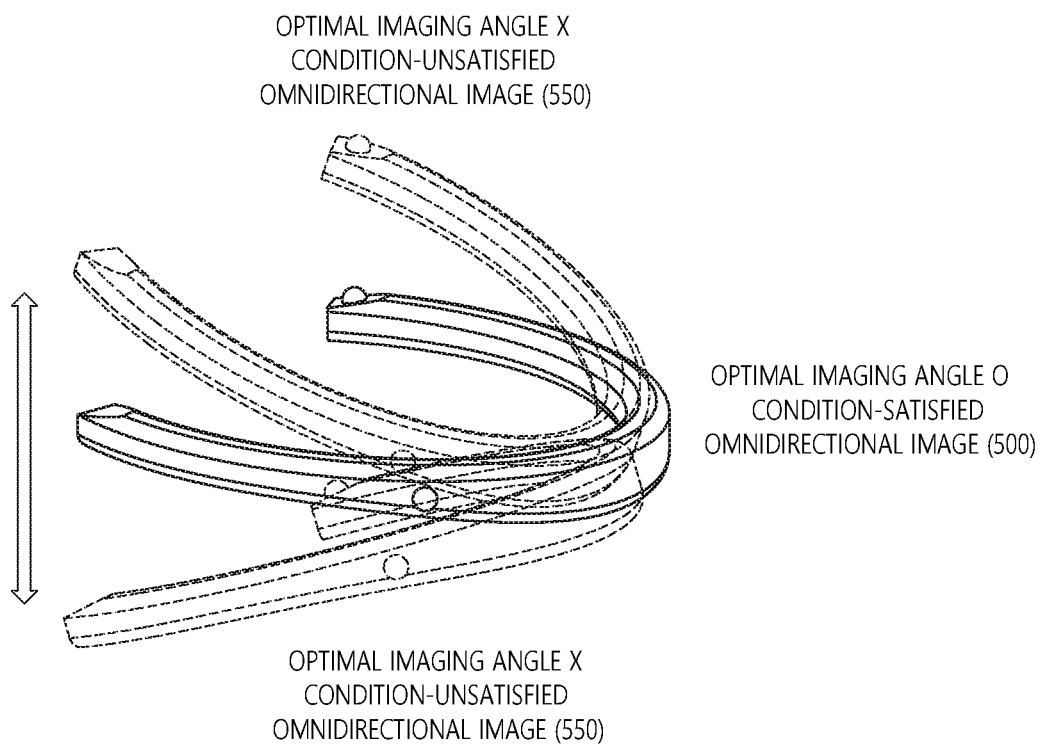
FIG. 5 is a conceptual view showing a method of performing imaging based on optimal situation determination according to an embodiment of the present invention.

FIG. 5 is a conceptual view showing a method of performing imaging based on optimal situation determination according to an embodiment of the present invention.

A method for performing imaging when a current imaging situation of the omnidirectional image processing apparatus satisfies an optimal imaging situation is disclosed in FIG. 5.

Referring to FIG. 5, the omnidirectional image processing apparatus may include a sensor for acquiring current imaging situation information of the omnidirectional image processing apparatus.

For example, the omnidirectional image processing apparatus may include an inclination sensor for recognizing the inclination of the omnidirectional image processing apparatus, a shake detecting sensor (or a motion sensor) for recognizing the shaking (or the movement) of the omnidirectional image processing apparatus, a position sensor for recognizing the position of the omnidirectional image processing apparatus, and the like.

Only when an optimal imaging situation for an imaging operation of the omnidirectional image processing apparatus is predefined and also when the current imaging situation of the omnidirectional image processing apparatus satisfies the optimal imaging situation, the omnidirectional image processing apparatus may perform imaging and generate a condition-satisfied omnidirectional image 500. When the omnidirectional image processing apparatus satisfies a predetermined optimal imaging situation, for example, when the omnidirectional image processing apparatus is stopped and not shaking, the omnidirectional image processing apparatus may automatically or manually start to perform imaging.

Specifically, when a user's gaze is within a critical angle, the omnidirectional image processing apparatus capable of being placed on the user's neck may be implemented such that a plurality of image imaging units included in the omnidirectional image processing apparatus have an imaging angle suitable for obtaining an optimal image. When the user's gaze is within the critical angle, the plurality of imaging units included in the omnidirectional image processing apparatus may inform the user of an optimal imaging angle through a signal such as vibration or sound (e.g., beep) and perform imaging automatically or manually according to the user's settings to generate a condition-satisfied omnidirectional image 500. The omnidirectional image processing apparatus may capture 120 frames per second, and the condition-satisfied omnidirectional image may be generated on the basis of a frame satisfying the condition among the 120 frames captured per second.

For example, when a user runs while wearing the omnidirectional image processing apparatus on his/her neck, an inclination value of the omnidirectional image processing apparatus may be continuously changed. The omnidirectional image processing apparatus may generate the condition-satisfied omnidirectional image 500 by performing imaging at a timing when an inclination set as a specific optimal imaging condition is satisfied while the omnidirectional image processing apparatus is being shaken.

Also, the degree of shaking of the omnidirectional image processing apparatus may be sensed, and imaging setting values (e.g., a shutter speed) may be changed. When the sensed degree of shaking is greater than or equal to a predetermined threshold value, the capturing of the omnidirectional image may be stopped.

Through the operation of the omnidirectional image processing apparatus, an omnidirectional image may be acquired in an optimal imaging situation despite the user behaving freely. When a determination is made on the optimal imaging situation of the omnidirectional image processing apparatus, the omnidirectional image captured by the omnidirectional image processing apparatus may be less shaken and may not be outside a certain angle of view range.

The optimal imaging situation of the omnidirectional image processing apparatus may be set by the user. When the user wants the omnidirectional image processing apparatus to seamlessly generate omnidirectional images, the range of conditions for the omnidirectional image processing apparatus to determine the optimal imaging situation may be set to be relatively wide. Conversely, when the user wants to acquire an omnidirectional image that is less shaken or that is obtained by capturing the certain angle of view range, the range of conditions for the omnidirectional image processing apparatus to determine the optimal imaging situation may be set to be relatively narrow.

The optimal imaging situation conditions may be set in consideration of the inclination, the position, and the like of the omnidirectional image processing apparatus.

According to an embodiment of the present invention, an omnidirectional image may be generated even when the optimal imaging situation condition is not satisfied. A condition-satisfied omnidirectional image 500 which satisfies the optimal imaging situation condition and a condition-unsatisfied omnidirectional image 550 which does not satisfy the optimal imaging situation condition may be distinguished from each other, and a final omnidirectional image may be generated through an image post-processing process. The final omnidirectional image may be generated using only the condition-satisfied omnidirectional image 500 or may be generated on the basis of the condition-satisfied omnidirectional image 500 and the edited condition-unsatisfied omnidirectional image 550.

When imaging based on optimal situation determination is performed, the omnidirectional image processing apparatus may include a communication unit implemented to communicate with an external apparatus (e.g., an image processing server or the like) and a processor operatively connected to the communication unit. The processor may perform an imaging operation/an image processing operation based on optimal situation determination, which will be described below. The image processing operation may be performed by an external apparatus other than the omnidirectional image processing apparatus, which is also included in the scope of the present invention.

As described above, the processor may be implemented to determine whether a current imaging situation satisfies the optimal imaging situation condition and to perform imaging and generate the condition-satisfied omnidirectional image 500 when the current imaging situation satisfies the optimal imaging situation condition. The optimal imaging situation condition may include an inclination condition of the omnidirectional image processing apparatus.

The processor may be implemented to generate the condition-satisfied omnidirectional image 500 when an inclination value measured by an inclination sensor is within a critical inclination range that is set on the basis of the inclination condition. The omnidirectional image processing apparatus may further include a motion sensor, and the optimal imaging situation condition may further include a motion condition of the omnidirectional image processing apparatus.

Also, the processor may be implemented to generate the condition-satisfied omnidirectional image 500 when a motion speed measured by the motion sensor is within a motion speed that is set on the basis of the motion condition.

The processor may be implemented to generate a final omnidirectional image by combining such condition-satisfied omnidirectional images 500.

Alternatively, when the current imaging situation does not satisfy the optimal imaging situation condition, the processor may perform imaging and generate the condition-unsatisfied omnidirectional image 550 and may generate the final omnidirectional image through image interpolation based on the condition-satisfied omnidirectional image 500 and the condition-unsatisfied omnidirectional image 550.

Figure 6:
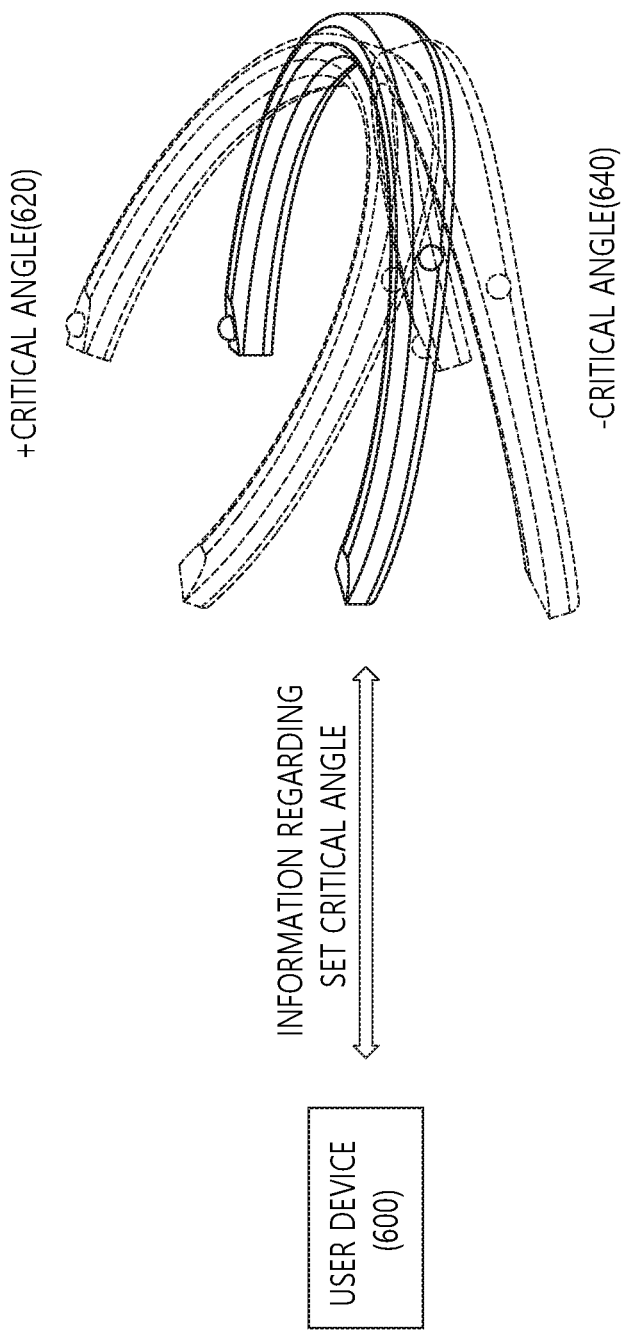
FIG. 6 is a conceptual view showing a method of setting an optimal imaging situation according to an embodiment of the present invention.

FIG. 6 is a conceptual view showing a method of setting an optimal imaging situation according to an embodiment of the present invention.

A method for setting an optimal imaging situation of the omnidirectional image processing apparatus is disclosed in FIG. 6. In particular, a method for setting an inclination value included in the optimal imaging situation is disclosed.

Referring to FIG. 6, the optimal imaging situation may include an inclination condition. As described above, the omnidirectional image processing apparatus may be worn in the form of being hung around the user's neck. When the angle of the neck changes due to an operation in which the user looks up or down, the inclination of the omnidirectional image processing apparatus may also be changed.

The user may wear the omnidirectional image processing apparatus, and the inclination condition may be set as the optimal imaging situation of the omnidirectional image processing apparatus. When the set inclination condition is satisfied, the omnidirectional image processing apparatus may generate the condition-satisfied omnidirectional image.

The inclination condition may be one inclination value of the omnidirectional image processing apparatus and also may be an inclination range between −critical angle 640 and +critical angle 620 with respect to one inclination value.

The user may set the inclination condition in various ways.

The omnidirectional image processing apparatus may transmit omnidirectional image information to a user device 600, and the omnidirectional image information may be output to a display of the user device. When the user looks ahead, information regarding the inclination may be output through the user terminal.

For example, the user may change the inclination of the omnidirectional image processing apparatus by looking up or down while checking a screen of the user device 600 to which the omnidirectional images is being output. The user may set the inclination value of the omnidirectional image processing apparatus to an allowable range on the basis of the user's actual operation in consideration of a change in omnidirectional image through the user device 600. The set inclination value may be transferred to the omnidirectional image processing apparatus, and the omnidirectional image processing apparatus may capture an omnidirectional image on the basis of the set inclination value.

Figure 7:
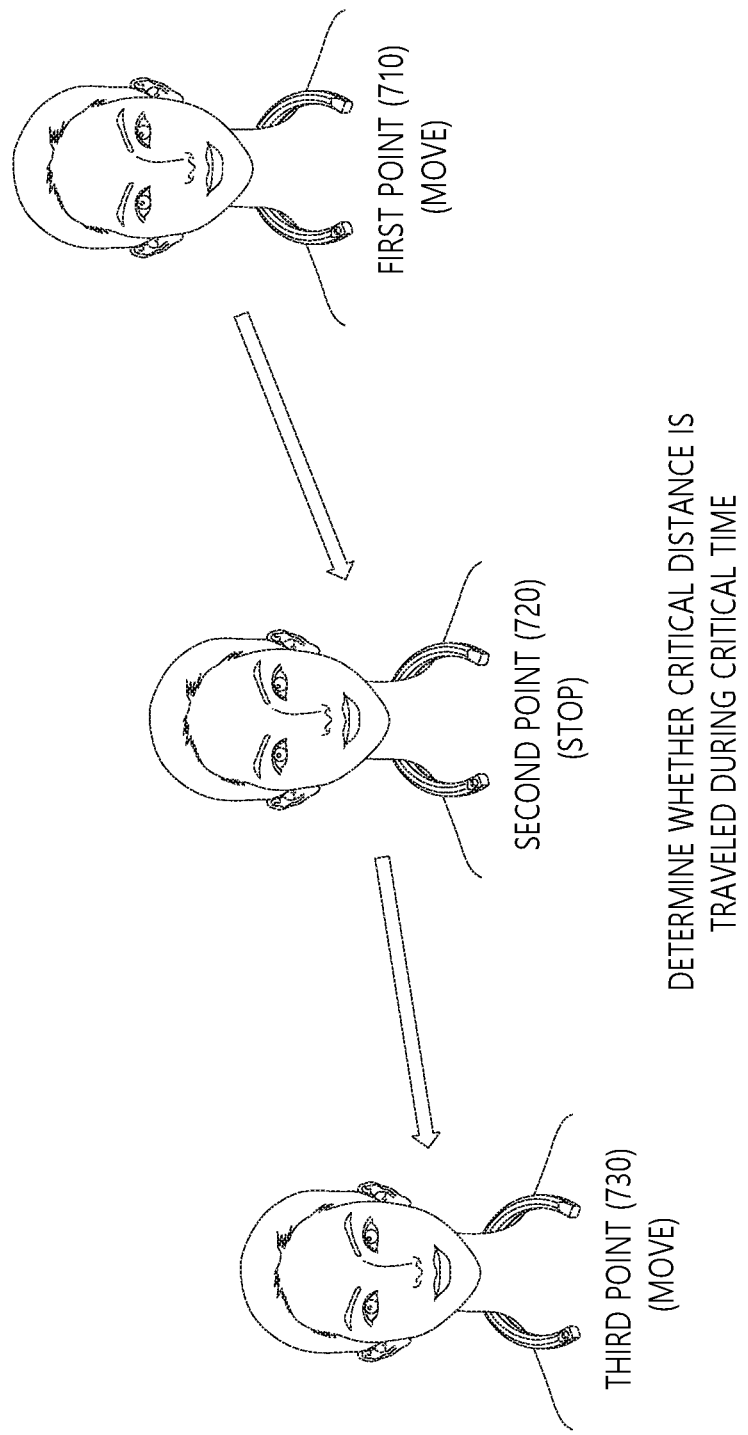
FIG. 7 is a conceptual view showing a method of setting an optimal imaging situation according to an embodiment of the present invention.

FIG. 7 is a conceptual view showing a method of setting an optimal imaging situation according to an embodiment of the present invention.

A method for setting an optimal imaging situation of the omnidirectional image processing apparatus is disclosed in FIG. 7. In particular, a method for setting a position value included in the optimal imaging situation is disclosed.

Referring to FIG. 7, the optimal imaging situation may include a condition for the position of the omnidirectional image processing apparatus.

For example, the optimal imaging situation condition may be set such that the omnidirectional image processing apparatus generates the condition-satisfied omnidirectional image only when a user moves a critical distance within a critical time.

It can be assumed that an omnidirectional image is captured through the omnidirectional image processing apparatus. When the user stops the movement, omnidirectional images may be continuously captured at the same position. Accordingly, in order to limit the continuous capturing of the omnidirectional images at the same position, the optimal imaging situation may be set such that the omnidirectional image processing apparatus generates the condition-satisfied omnidirectional image only when a user moves a critical distance within a critical time. For example, only when the position of the omnidirectional image processing apparatus is changed by one meter or more in two seconds may the omnidirectional image processing apparatus generate the condition-satisfied omnidirectional image.

It can be assumed that when the user moves from a first point 710 to a third point 730 through a second point 720, the user stops moving temporarily at the second point 720. When the user does not move the critical distance within the critical time at the second point 720, the capturing of the omnidirectional image may be temporarily stopped after the critical time.

Figure 8:
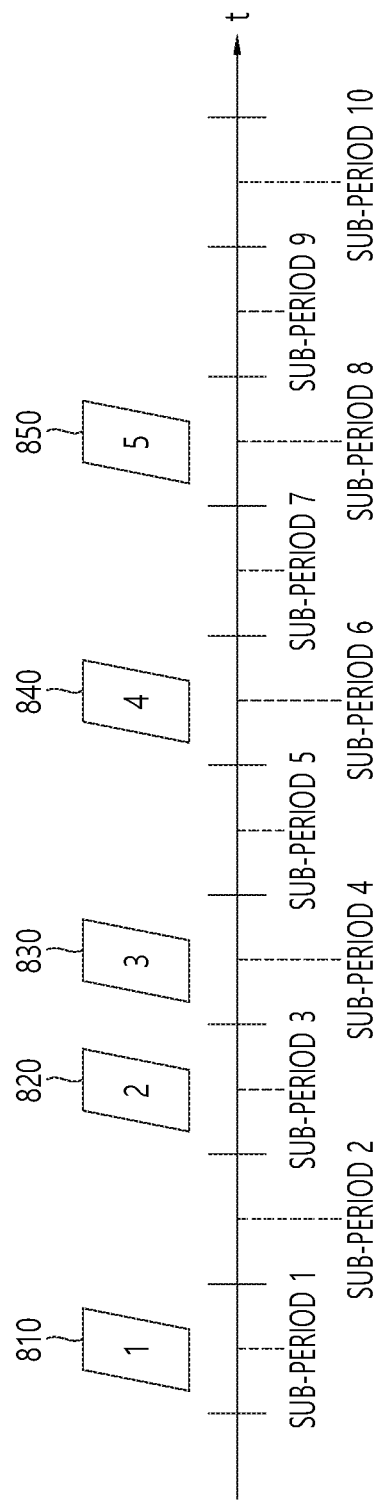
FIG. 8 is a conceptual view showing an omnidirectional image generating method according to an embodiment of the present invention.

FIG. 8 is a conceptual view showing an omnidirectional image generating method according to an embodiment of the present invention.

A method for editing a condition-satisfied omnidirectional image that satisfies an optimal imaging situation and generating a final omnidirectional image is disclosed.

Referring to FIG. 8, it is assumed that the final omnidirectional image is generated using only condition-satisfied omnidirectional images that satisfy the optimal imaging situation.

According to an embodiment of the present invention, an entire period during which a plurality of condition-satisfied omnidirectional images are generated may be divided into a plurality of sub-periods, and the plurality of condition-satisfied omnidirectional images match the plurality of sub-periods. Subsequently, as necessary, the final omnidirectional image may be generated through image interpolation in consideration of information regarding the period.

For example, the smallest time interval among intervals between condition-satisfied omnidirectional images generated in chronological order may be set as the interval of the sub-period Five condition-satisfied omnidirectional images (first to fifth condition-satisfied omnidirectional images 810 to 850) may be sequentially generated for ten seconds. The time interval between the second condition-satisfied omnidirectional image 820 and the third condition-satisfied omnidirectional image 830 may be the smallest time interval. The time interval between the second condition-satisfied omnidirectional image 820 and the third condition-satisfied omnidirectional image 830 may be one second.

In this case, the entire period of ten seconds may be divided into ten sub-periods of one second (first to tenth sub-periods).

In consideration of the time required to generate the five condition-satisfied omnidirectional images, each of the five condition-satisfied omnidirectional images may correspond to any one of the ten sub-periods.

For example, the first condition-satisfied omnidirectional image 810 may correspond to the first sub-period, the second condition-satisfied omnidirectional image 820 may correspond to the third sub-period, the third condition-satisfied omnidirectional image 830 may correspond to the fourth sub-period, the fourth condition-satisfied omnidirectional image 840 may correspond to the sixth sub-period, and the fifth condition-satisfied omnidirectional image 850 may correspond to the eighth sub-period.

For an omnidirectional image during a sub-period having no corresponding condition-satisfied omnidirectional image, interpolation may be performed on the basis of a condition-satisfied omnidirectional image corresponding to the most adjacent sub-period or a combination of a plurality of condition-satisfied omnidirectional images corresponding to adjacent sub-periods.

For example, an omnidirectional image corresponding to the second sub-period may be obtained by performing interpolation on the basis of the first condition-satisfied omnidirectional image 810 or the second condition-satisfied omnidirectional image 820 or both of the first condition-satisfied omnidirectional image 810 and the second condition-satisfied omnidirectional image 820.

An omnidirectional image corresponding to the fifth sub-period may be obtained by performing interpolation on the basis of the third condition-satisfied omnidirectional image 830 or the fourth condition-satisfied omnidirectional image 840 or both of the third condition-satisfied omnidirectional image 830 and the fourth condition-satisfied omnidirectional image 840.

Omnidirectional images corresponding to the ninth sub-period and the tenth sub-period may be obtained by performing interpolation on the basis of the fifth condition-satisfied omnidirectional image 850.

The plurality of omnidirectional images corresponding to the plurality of sub-periods may be determined through interpolation based on adjacent condition-satisfied omnidirectional images. A final omnidirectional image may be generated using a combination of the plurality of omnidirectional images in consideration of chronological order.

When there is no need to generate an omnidirectional image according to the time, the final omnidirectional image may be generated on the basis of a combination of only the condition-satisfied omnidirectional images.

Figure 9:
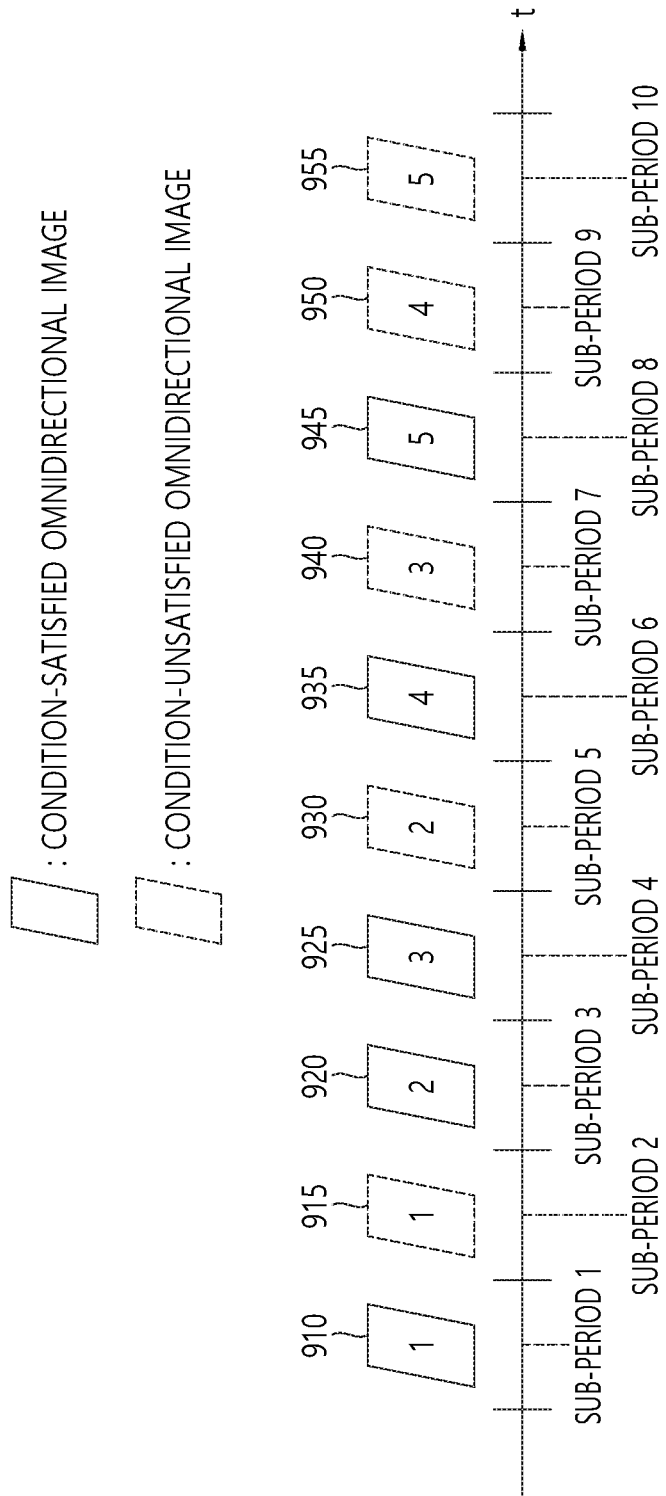
FIG. 9 is a conceptual view showing an omnidirectional image generating method according to an embodiment of the present invention.

FIG. 9 is a conceptual view showing an omnidirectional image generating method according to an embodiment of the present invention.

A method for editing a condition-satisfied omnidirectional image that satisfies an optimal imaging situation and/or a condition-unsatisfied omnidirectional image that does not satisfy an optimal imaging situation and generating a final omnidirectional image is disclosed.

Referring to FIG. 9, the final omnidirectional image may be generated in consideration of information regarding the condition-unsatisfied omnidirectional images.

As disclosed in FIG. 8, it can be assumed that the sub-period is one second and also that five condition-satisfied omnidirectional images (first to fifth condition-satisfied omnidirectional image 910 to 950) and five condition-unsatisfied omnidirectional images (first to fifth condition-unsatisfied omnidirectional images 915 to 955) are generated for ten seconds.

The first sub-period may correspond to the first condition-satisfied omnidirectional image 910. The second sub-period may correspond to the first condition-unsatisfied omnidirectional image 915. The third sub-period may correspond to the second condition-satisfied omnidirectional image 920. The fourth sub-period may correspond to the third condition-satisfied omnidirectional image 930. The fifth sub-period may correspond to the second condition-unsatisfied omnidirectional image 925. The sixth sub-period may correspond to the fourth condition-satisfied omnidirectional image 940. The seventh sub-period may correspond to the third condition-unsatisfied omnidirectional image 935. The eighth sub-period may correspond to the fifth condition-satisfied omnidirectional image 950. The ninth sub-period may correspond to the fourth condition-unsatisfied omnidirectional image 945. The tenth sub-period may correspond to the fifth condition-unsatisfied omnidirectional image 955.

In this case, the omnidirectional images during the sub-periods corresponding to the condition-unsatisfied omnidirectional images may be determined in consideration of the condition-unsatisfied omnidirectional images as well as adjacent condition-satisfied omnidirectional images.

For example, an image in a region overlapping with a view of angle of a condition-satisfied omnidirectional image among the condition-unsatisfied omnidirectional images may be utilized to generate a final omnidirectional image. When a condition-unsatisfied omnidirectional image is generated due to an operation in which a user bends his/her neck, a partial region of the condition-unsatisfied omnidirectional image may be utilized to predict an omnidirectional image in a sub-period corresponding to the condition-unsatisfied omnidirectional image.

An omnidirectional image corresponding to the second sub-period may be generated through interpolation in consideration of the first condition-satisfied omnidirectional image 910, the second condition-satisfied omnidirectional image 920, and a partial region of the first condition-unsatisfied omnidirectional image 915. The partial region of the first condition-unsatisfied omnidirectional image 915 may be a region having a view of an angle overlapping with those of the first condition-satisfied omnidirectional image 910 and the second condition-satisfied omnidirectional image 920 or a region of the first condition-unsatisfied omnidirectional image 915 where an object is more clearly captured.

For example, when a moving object is present, whether the object is present in a partial region of the first condition-unsatisfied omnidirectional image 915 may be determined in order to more accurately determine a position in the omnidirectional image corresponding to the second sub-period, and the position of the object may be more accurately determined in the second sub-period.

FIG. 10 is a conceptual view showing an operation of an omnidirectional image processing apparatus according to an embodiment of the present invention.

A method for controlling an operation of an imaging unit of the omnidirectional image processing apparatus on the basis of an inclination value of the omnidirectional image processing apparatus is disclosed in FIG. 10.

Referring to FIG. 10, the angle of a lens of an imaging unit 1000 included in the omnidirectional image processing apparatus may be changed on the basis of an inclination value sensed by the omnidirectional image processing apparatus.

For example, when the inclination value of the omnidirectional image processing apparatus is changed such that an imaging line of the imaging unit 1000 is within a critical angle range, a lens of the imaging unit 1000 may be driven to change the direction of an imaging line of the lens.

For example, when a change in inclination of 10 degrees in a first direction occurs in the omnidirectional image processing apparatus, the imaging line of the lens of the imaging unit 1000 may also instantly change the angle of the imaging line by 10 degrees in a second direction which is opposite to the first direction.

Through this method, it is possible to maintain the imaging line in a certain critical angle range, and it is also possible to correct shaking in a generated omnidirectional image.

Also, according to the present invention, it is possible to generate a natural omnidirectional image based on an optimal image captured in an optimal situation by an omnidirectional image processing apparatus and then provide the generated omnidirectional image to a user.

The above-described embodiments of the present invention may be implemented in the form of program instructions executable by various computer elements and recorded in a computer-readable recording medium. The computer-readable recording medium may include program instructions, data files, data structures, etc. alone or in combination. The program instructions recorded on the computer-readable recording medium may be specially designed and configured for the present invention or known to and used by those of ordinary skill in the computer software field. Examples of the computer-readable recording medium include magnetic media, such as a hard disk, a floppy disk, and magnetic tape, optical media, such as a compact disc read-only memory (CD-ROM) and a digital versatile disc (DVD), magneto-optical media, such as a floptical disk, and hardware devices, such as a ROM, a random access memory (RAM), and a flash memory, specially configured to store and perform program instructions. Examples of the program instructions include not only machine language code produced by a compiler but also high-level language code that can be executed by a computer through an interpreter or the like. To perform the operations of the present invention, the hardware devices may be configured as one or more software modules, and vice versa.

While the present invention has been described above with reference to specific details, such as detailed elements, by way of limited embodiments and drawings, these are provided merely to aid the overall understanding of the present invention. The present invention is not limited to the embodiments, and various modifications and changes can be made thereto by those of ordinary skill in the technical field to which the present invention pertains.

Therefore, the spirit of the present invention should not be limited to the above-described embodiments, and the scope of the present invention should be regarded as encompassing not only the following claims but also their equivalents and variations.

What is claimed is:

1. A method of performing imaging based on optimal situation determination, which is performed by an omnidirectional image processing apparatus, the method comprising:

determining whether a current imaging situation satisfies an optimal imaging situation condition; and performing imaging and generating a condition-satisfied omnidirectional image when the current imaging situation satisfies the optimal imaging situation condition, wherein the optimal imaging situation condition includes an inclination condition of the omnidirectional image processing apparatus, wherein, the omnidirectional image processing apparatus is a wearable device, the omnidirectional image processing apparatus comprises an inclination sensor, and the omnidirectional image processing apparatus generates the condition-satisfied omnidirectional image when an inclination value measured by the inclination sensor is included in a critical inclination range that is set based on the inclination condition, wherein, the omnidirectional image processing apparatus further comprises a motion sensor, the optimal imaging situation condition further comprises a motion condition of the omnidirectional image processing apparatus, and the omnidirectional image processing apparatus generates the condition-satisfied omnidirectional image when a motion speed measured by the motion sensor is included in a motion speed range that is set based on the motion condition, wherein the method further comprises performing imaging and generating a condition-unsatisfied omnidirectional image when the current imaging situation does not satisfy the optimal imaging situation condition, wherein the omnidirectional image processing apparatus generates a final omnidirectional image through image interpolation based on the condition-satisfied omnidirectional image and the condition-unsatisfied omnidirectional image.

2. The method of claim 1, wherein the omnidirectional image processing apparatus combines a plurality of condition-satisfied omnidirectional images identical to the condition-satisfied omnidirectional image to generate a final omnidirectional image.

3. An omnidirectional image processing apparatus for performing imaging based on optimal situation determination, the omnidirectional image processing apparatus comprising:

a communication unit configured to communicate with an external device; and a processor operatively connected to the communication unit, wherein the processor is implemented to determine whether a current imaging situation satisfies an optimal imaging situation condition and to perform imaging and generate a condition-satisfied omnidirectional image when the current imaging situation satisfies the optimal imaging situation condition, and the optimal imaging situation condition includes an inclination condition of the omnidirectional image processing apparatus, wherein the omnidirectional image processing apparatus is a wearable device, the omnidirectional image processing apparatus comprises an inclination sensor, and the processor is implemented to generate the condition-satisfied omnidirectional image when an inclination value measured by the inclination sensor is included in a critical inclination range that is set based on the inclination condition, wherein, the omnidirectional image processing apparatus comprises a motion sensor, the optimal imaging situation condition further includes a motion condition of the omnidirectional image processing apparatus, and the processor is implemented to generate the condition-satisfied omnidirectional image when a motion speed measured by the motion sensor is included in a motion speed range that is set based on the motion condition, wherein, the processor is implemented to perform imaging and generate a condition-unsatisfied omnidirectional image when the current imaging situation does not satisfy the optimal imaging situation condition, and the processor is implemented to generate a final omnidirectional image through image interpolation based on the condition-satisfied omnidirectional image and the condition-unsatisfied omnidirectional image.

4. The omnidirectional image processing apparatus of claim 3, wherein the processor is implemented to combine a plurality of condition-satisfied omnidirectional images identical to the condition-satisfied omnidirectional image to generate a final omnidirectional image.

5. A computer-readable recording medium having a computer program recorded thereon for executing the method of claim 1.

* * * * *